United States Patent [19]

Sauter et al.

[11] Patent Number: 5,067,371
[45] Date of Patent: Nov. 26, 1991

[54] METHOD AND APPARATUS TO CONTROL LOCKING OF A TOOL TURRET

[75] Inventors: Willy Sauter, Reutlingen; Helmut Thumm, Metzigen; Rainer Wahl, Grafenberg; Dieter Widmann, Neckartenzlingen, all of Fed. Rep. of Germany

[73] Assignee: Sauter Feinmechanik GmbH, Metzingen, Fed. Rep. of Germany

[21] Appl. No.: 496,019

[22] Filed: Mar. 20, 1990

[30] Foreign Application Priority Data

Apr. 8, 1989 [DE] Fed. Rep. of Germany ....... 3911522

[51] Int. Cl.$^5$ .......................................... B23Q 16/00
[52] U.S. Cl. ............................. 74/813 L; 74/813 C; 29/48.5 A; 82/159
[58] Field of Search ............... 74/813 C, 813 L, 815, 74/816, 817; 29/48.5 A; 82/159, 160

[56] References Cited

U.S. PATENT DOCUMENTS

| | | | |
|---|---|---|---|
| 3,196,715 | 7/1965 | Rainey et al. | 74/813 C |
| 4,202,227 | 5/1980 | Thumm | 74/813 L |
| 4,324,161 | 4/1982 | Klancnik et al. | 74/826 X |
| 4,366,421 | 12/1982 | Eto et al. | 74/813 C X |
| 4,422,352 | 12/1983 | Boffelli | 74/813 L |
| 4,468,986 | 9/1984 | Foret | 74/818 X |
| 4,587,871 | 5/1986 | Lahm | 74/814 X |
| 4,635,507 | 1/1987 | Kojima | 74/813 C |
| 4,944,198 | 7/1990 | Natale et al. | 74/813 L X |
| 4,991,474 | 2/1991 | Thumm et al. | 82/159 |

FOREIGN PATENT DOCUMENTS

| | | |
|---|---|---|
| 2128642 | 12/1972 | Fed. Rep. of Germany . |
| 2627780 | 1/1978 | Fed. Rep. of Germany . |
| 3030089 | 3/1982 | Fed. Rep. of Germany . |
| 3231782 | 3/1984 | Fed. Rep. of Germany . |
| 3311105 | 10/1984 | Fed. Rep. of Germany . |
| 89526 | 4/1972 | German Democratic Rep. . |
| 254899 | 3/1988 | German Democratic Rep. . |

OTHER PUBLICATIONS

Research Disclosure, Mar. 1982, "Indexing Apparatus", Author (Anonymous), p. 70.

Primary Examiner—Rodney M. Lindsey
Attorney, Agent, or Firm—Roylance, Abrams, Berdo & Goodman

[57] ABSTRACT

For controlling the locking of the rotatable tool holder of a tool turret, the angular position of the tool holder is determined by a rotating transmitter. The rotating transmitter is rotated corresponding to the rotary movement of a control and synchronization device. Digital signals are produced with the aid of the rotating transmitter. Each digital signal is associated with one angular position of those which may be selected. With each of these signals, the indicator is changed in those two angular positions of the control and synchronization device for locking and unlocking of the tool holder at each of its angular positions. The indicator is changed by the rotary movement of the device in one or the other direction out of the associated angular position and into the angular position associated with the locking of the tool holder. These rotary transmission signals are used to control the locking. The control and synchronization device has a first and a second driven part which are nonrotatable relative to the tool holder, and a driving part which is driven when the drive motor is connected. The driving part is coupled with no rotary movement form-locking with one driven part.

13 Claims, 1 Drawing Sheet

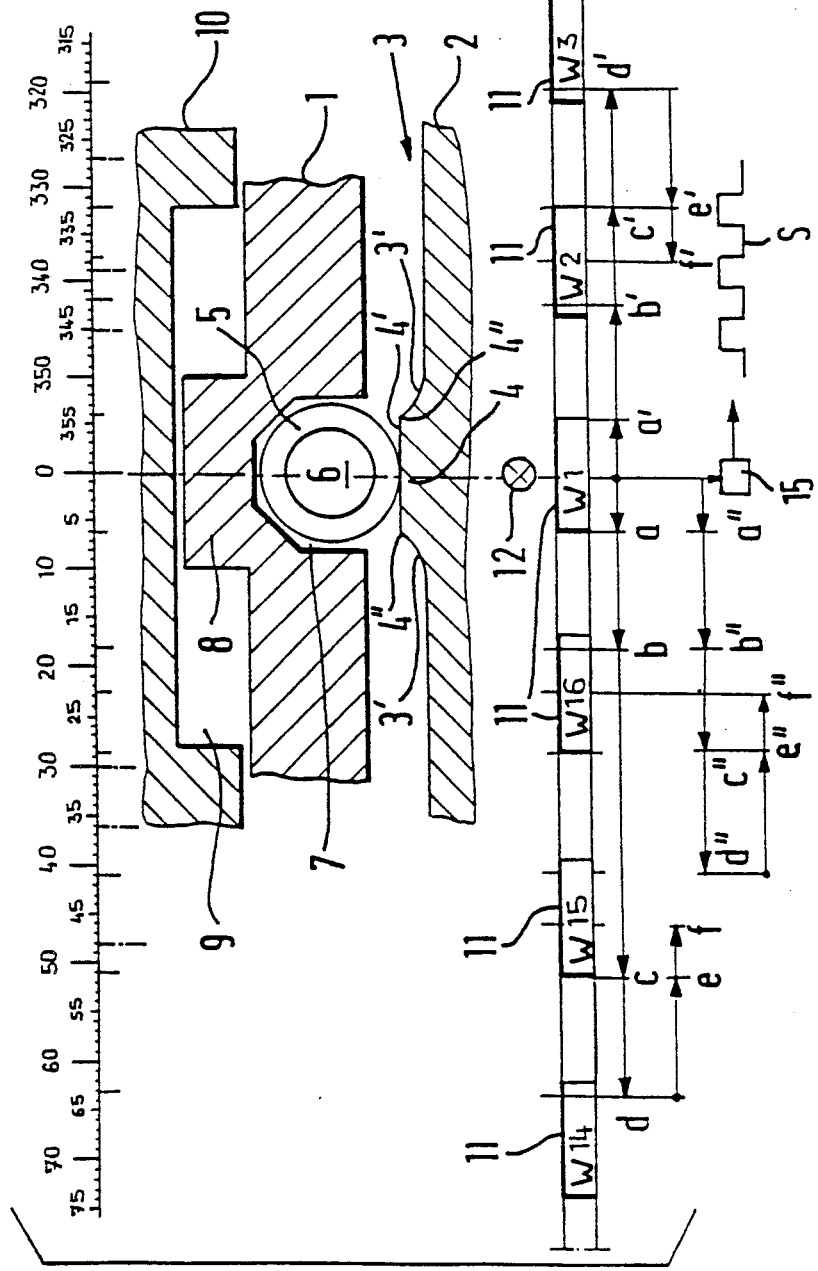

METHOD AND APPARATUS TO CONTROL LOCKING OF A TOOL TURRET

BACKGROUND OF THE INVENTION

Traditionally, control of the tool holder locking is operated by a proximity switch associated with a disk rotating together with the tool holder. A signal from the proximity switch is generated in each of the angular positions into which the tool holder can be locked. The adjacent areas of the disk which operate the proximity switch are offset relative to one another around a relatively small angle of rotation, which is the case for turret heads with a great number of angular positions which can be selected. Any position may be selected from any other position. During operation at high switching velocity, as desired and sought for any such tool turret, the danger exists that the proximity switch will produce false signals.

According to one unpublished proposal, these difficulties can be avoided with the aid of a trigger cam arranged to revolve on a drive shaft for the tool holder. As a result of an intercalated gearing mechanism, the drive shaft also rotates at least 180° when the tool holder is rotated into the directly adjacent angular position. With each revolution of this shaft, the trigger cam is carried along as a result of the friction lock as far as a next abutment. In the reversing operation required for the locking, the trigger cam is turned back into the switch position in which it triggers the control signal of the proximity switch.

SUMMARY OF THE INVENTION

An object of the present invention is to provide a simple method to control the locking of a tool holder in position in a tool turret, which method functions reliably with a large number of suitable angular positions, any of which may be selected and at high switching velocities.

The foregoing object is obtained by a method for controlling locking of a rotatable tool holder of a tool turret during rotation of the tool holder into different angular positions distributed uniformly around an entire periphery of the tool holder. The method comprises the steps of rotating a control and synchronization device and a tool holder in one direction to a new angular position in which the tool holder is to be locked, locking the tool holder in the new angular position by subsequent rotation of the control and synchronization device in an opposite direction, and determining the angular position of the tool holder by a rotating transmitter. This determination includes rotating the rotating transmitter correspondingly to rotar movement of the control and synchronization device, producing digital signals with the rotating transmitter and indicating locking of the tool holder by level changes in the digital signals of the rotating transmitter. Each digital signal is associated with one of the angular positions of the tool holder which may be selected. The digital signals change their levels in those angular positions of the control and synchronization device during movement in directions to associated positions thereof when a locking condition of the tool holder is changed.

The production of the locking control signal in digital form, with the aid of the rotating transmitter required for determination of the angular position of the tool holder, provides a reliable locking control at high rotary velocity. Additionally, when there is a small angle between two adjacent possible angular positions, the invention also considerably reduces the cost of layout for control of the locking. To determine the angular position and control the locking, only one single further structural member is required, which is the rotating transmitter. The proximity switch and the switch device associated therewith, consisting of trigger cams and pulling device, may be deleted.

It is even possible to use the control signals produced in each of the suitable angular positions which may be selected as timing relay signals. For that reason the normally provided timing track of the rotating transmitter can be configured as the track producing the control signals. The rotating transmitter then does not require an increased number of tracks.

Another object of the present invention is to provide an apparatus of low-cost construction for execution of the method according to the present invention.

The foregoing object is obtained by an apparatus for controlling and synchronizing locking of a rotatable tool holder of a tool turret during rotation of the tool holder into different angular positions distributed uniformly around an entire periphery of the tool holder. The apparatus comprises first and second driven parts coupled nonrotatably relative to a tool holder, and a driving part having coupling means for coupling the driving part to a drive motor so as to be rotated thereby. The driving part is coupled by form-locking means to the second driven part with backlash travel in rotary directions for rotary movement relative to the first and second driven parts between a first position in which the tool holder is locked and a second position in which the tool holder is unlocked. A cam surface with two different levels and follower elements engaging the cam surface are located between the driven and driving parts for axial movement of the driving part relative to one of the first and second driven parts. A rotating transmitter is coupled to the driving part for simultaneous rotation therewith. The rotating transmitter includes a signal transmitter producing a digital control signal for each angular position of the tool holder which can be selected. Each signal has a middle aligned with a middle of one level portion of said cam surface having flanks aligned with level changes in the cam surface for locking and unlocking of the tool holder.

Advantageously for the production of the control signals, the rotating transmitter has a disk with windows having borders lying in series sequentially about the disk periphery. In order to align the side boundaries of the windows in this disk exactly with those angular positions in which the tool holder is either unlocked (released) or locked (latched), in one preferred embodiment, a cam curve or surface is formed with two levels which causes the unlocking or release and the locking or latching.

A uniform window width is selected so as to not require different rotating transmitters for the various different numbers of angular positions which may be selected for the tool holder. The distance between two adjacent windows is then dependent solely upon the number of angular positions offered. If the number of angular positions is multiplied by two or four, it is still possible to use the same window arrangement. Then, only in the case of multiples of four, each angular position is associated with each one of the windows. With the multiple of two, every second window is oriented to an angular position which may be selected. Correspondingly, with the lowest number of different angular positions, only every fourth window is oriented to such an angular position.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a diagrammatic representation of a partial side elevational view in cross section through the structural parts controlling the locking of the tool holder, an angular scale in correct angular relation, and a part of a rotating transmitter with windows provided for producing locking control signals with an associated light source, for embodiments of a tool turret with 8 or 16 possible angular positions which may be selected; and FIG. 2 is a diagrammatic representation of a suitable, angularly correct relation of the windows of a rotating transmitter, with reference to the structural parts shown in FIG. 1, controlling the locking and unlocking of the tool holder, together with the relevant light source, for embodiments of a tool turret with six, twelve or twenty-four angular positions which may be selected.

DETAILED DESCRIPTION OF THE INVENTION

A tool turret has a rotatably mounted tool holder on the one contact surface of a turret housing. In this exemplary embodiment, the tool turret can be locked in 16 different angular positions, so that the angle between each two adjacent angular positions is 22.5°. Two toothed wheels are provided for the exact setting of the selected angular position and the locking of the tool holder with the housing. The two toothed wheels come into engagement with one another in the locking position without any play. One toothed wheel is connected securely with the tool holder. The other toothed wheel is nonrotatable, but is arranged to be axially movable in the turret housing. The drive to rotate the tool holder to a different angular position, as is known, comprises an electric motor built into the turret housing or mounted thereon by being flanged to the housing.

Through a gearing, this electric motor actuates a driving disk 1 arranged rotatably in the turret housing, coaxial to the rotary axis of the tool holder. As is shown in the exemplary embodiment, since the tool holder is connected securely with the one end of a drive shaft, the driving disk 1 can be arranged to revolve on the same drive shaft. However, it is important that driving disk 1 also be movable axially relative to the tool holder, since the driving disk cooperates with a control member or driven, part 2 having a cam surface 3 on the surface or side turned toward driving disk 1.

Cam surface 3 extends concentric to the rotary axis of control member 2. Cam surface 3 is provided with a least two cams 4 arranged uniformly around the circumference. The segments of cam surface 3 lying between cams 4 lie in a first radial plane. In a second radial plane, aligned parallel to this first radial plane, lies the contact surface 4' of cam 4. This contact surface 4' reaches or extends 12° around the periphery in the exemplary embodiment. The middle of contact surface 4' of each cam 4 is aligned with one of the angular positions which may be selected for the tool holder.

As shown in FIG. 1, contact surface 4' of cam 4 is bordered peripherally around its control member 2 by an edge 4" on each side of the cam contact surface. Each edge 4" rises from and is attached to a curved surface 3' which is a transition area on each side of the cam contact surface.

A number of rollers or follower elements 5, corresponding to the number of cams 4, run on cam surface 3. Rollers 5 are mounted rotatably in an arrangement wherein each roller is oriented on a radial axis 6 of driving disk 1 corresponding to the arrangement of cams 4. As shown in FIG. 1, in the first exemplary embodiment, driving disk 1 is provided with one recess 7 for each roller. Each recess 7 opens toward control member 2 and incompletely surrounds roller 5 to keep the spacing between driving disk 1 and control member 2 small.

A rectangular catch 8 is provided in the segment of driving disk 1 including recess 7, projecting out axially away from recess 7 on the side of driving disk 1 away from control member 2. Catch 8 engages in a likewise rectangular groove 9 of a structural or driven part 10. Structural part 10 cannot be moved rotatably nor axially relative to the tool holder. Instead of connecting structural part 10 securely with the tool holder, groove 9 could also be provided directly in the tool holder itself.

The distance of projection of catch 8 above the surface of driving disk 1 opposite control member 2 (in other words, the measured height of catch 8 in axial direction) is greater than the measured height of cam 4 in this same direction. The height of cam 4 in turn must be greater than the depth of engagement of the gear teeth of the two toothed wheels by which the tool holder can be locked in place. FIG. 1, however, shows that there is no contact between the facing surfaces of driving disk 1 and structural part 10, and no contact between the surfaces of catch 8 and the bottom of groove 9 which is parallel thereto. The calibration of catch 8 circumferentially, which is 20° in the exemplary embodiment, and the corresponding width of groove 9, which is 56° in the exemplary embodiment, could also be selected to be somewhat different than in the exemplary embodiment. It is essential only that with one revolution of the driving disk relative to structural member 10 circumferentially for the distance of a predetermined angle, which in the exemplary embodiment is 18°, the side of catch 8 comes into engagement with the side of groove 9.

The tool turret has a rotating transmitter. The rotating transmitter serves for the disposition of the angular position of the tool holder and, for that purpose, is rotated together with the tool holder for the same distance. As opposed to many known turrets, then, the translation ratio between rotating transmitter and tool holder is 1:1.

The rotating transmitter can be configured such that it can detect the ultimate position of the tool holder, as is the case with known angular position indicators. However, it can also be configured to provide an incremental analysis of the angular position. In both cases it is conventional to use an optically scannable plate. Such device is also shown in the exemplary embodiment, provided in the same dimensions as the disk rotating the driving disk 1. It has sixteen windows 11 (W1, W2, W3, W4...W14, W15, and W16) one track, with the middle of each window aligned with one of the sixteen angular positions which can be selected for the tool holder. The reach or extent of window 11 is identical to the reach or extent of contact surface 4' of cam 4 in circumferential direction. The reach is 12° in the exemplary embodiment. Therefore, the space between two adjacent windows 11 extends over 10.5°. A light enclosure is associated with the track having windows 11.

Only the light source 12 is arranged stationarily in the rotating transmitter. Light source 12 directs a very narrow light beam in the direction of rotation of the disk on the track having windows 11. This light beam then can fall only on receiver 15 which generates timing signals S when one of the windows 11 lets the light beam shine through.

In the case of angular position transmitter, the track having windows 11 is present in addition to the other tracks. On the contrary, if a rotating transmitter is provided with incremental angular measurement, then the track having windows 11 can also be used as a timing track. Only one more additional track is then required carrying the reference marks.

The tool holder can be brought out of the angular position, which is the basis of FIG. 1, into an angular position offset by 45° from the original position. In the case of eight possible angular positions, that will be the next adjacent position. In the case of sixteen possible angular positions, it will be the second angular position away from the original. The direction of rotation of the tool holder is to correspond to a thrusting of driving disk 1 to the right in the line of view according to FIG. 1.

First, a not shown indexing bolt must be drawn back into its release position by the solenoids operating it. The electric motor is actuated and operated in the direction of rotation required for the desired rotary movement of driving disk 1 and first moves roller 5 as far as edge 4'. Since the disk of the rotating transmitter bearing windows 11 revolves in the same direction and for the same distance as driving disk 1, the light beam from light source 12 reaches the position shown with reference a on the left border of the first window 11 when roller 5 has reached the right edge 4' of cam 4. With continued movement, roller 5 passes along on the transition area 3' of cam curve 3, and driving disk 1 is thrust in axial direction against or toward control member 2. The two toothed wheels then come out of engagement, so that the tool holder is on unlocked henceforth.

After the light beam has been released again by the sixteenth window 11 and has reached position b, the side of catch 8 comes into engagement on the side of groove 9. Thus, structural part 10 and together with it the tool holder is now carried along in form-locking connection by driving disk 1. As soon as the light beam again departs from the fifteenth window 11, and thus, is interrupted which is the case in position c, the solenoid operating the indexing bolt is activated. The indexing bolt then will move in its locked position as soon as the tool holder has reached the new angular position. In this position the light beam is again released in the position d, through the fourteenth window after passing through a 63° angle.

Henceforth, the direction of rotation of the driving disk is reversed. The tool holder remains in the angular position which has been approximately defined by the indexing bolt, and driving disk 1 is rotated in the opposite direction. When roller 5 at the end of transition area 3' has reached the edge 4" pf the cam 4, both of the toothed wheels are again completely in engagement. The tool holder not only is locked by the teeth, but also is exactly in position. In this rotary position of driving disk 1, the light beam is again at the left border of the fifteenth window 11 in position e, which coincides with the position c. After further rotation of 6°, the solenoid is disconnected, because now roller 5 again stands in the middle of contact surface 4' of cam 4. The light beam is now located in the middle of the fifteenth window 11 in position f.

With one revolution of the tool holder in the opposite direction into the next adjacent angular position, in the case of sixteen possible angular positions which may be selected, the procedure runs accordingly. FIG. 1 represents only the positions corresponding to a', b', c', d', e' and f' of the light beam relative to the first to the fourth windows 11.

Furthermore, the corresponding positions of the light beam are shown in FIG. 1 with the references a", b", c", d", e" and f", which are identical for the case wherein sixteen angular positions can be selected and the tool holder is rotated around only one angular position.

Insofar as the tool holder can be locked in six, twelve or twenty-four angular positions, a rotating transmitter may alternatively be used which, instead of the track with windows 11, has a track with windows 13 (see FIG. 2). However one could also use an angular transmitter which has the track with windows 13 (W1, W2, W3, W4...W33, W23, and W24) in addition to the track with windows 11 and in which either one or the other track can be selected, as desired.

Windows 13 have the same reach or extent in the direction of rotation of the disk as windows 11 in the first exemplary embodiment, in other words a reach over 12°. Since twenty-four windows 13 are provided, the spacing between any two adjacent windows is 3°. Basically, the path of movement is identical to that shown in the first exemplary embodiment of FIG. 1. In FIG. 2, only a revolution in the second alternate angular position from the original in the one direction of rotation, and into the next angular position in the opposite direction of rotation is indicated. In the case of 24 angular positions which may be selected, the positions of the light beam corresponding to the rotary angles are registered, in which this light beam is located. When roller 5 departs from contact surface 4' (positions a and a'), the synchronization of structural part 10 begins by means of driving disk 1 (positions b and b'). The magnet of the indexing bolt is connected (positions c and c'). When the tool holder has reached the set-point position, the indexing bolt drops, and the reversal of the direction of rotation is introduced (positions d and d'). In the reversal operation, roller 5 has again reached edge 4" of cam 4 (positions e and e') and the reversal movement of driving disk 1 is terminated (positions f and f').

Since the locking control signal is not experienced until the end of the reversal movement, one of the windows 11 or 13 again frees the light beam. The light beam is interrupted while roller 5 passes over transitional area 3' of cam surface 3. The locking control signal is produced by the receiver associated with light source 12 or 14. A change in an indicator serves as control signal. The electronic signal processing unit thus needs only to compute the number of indicator changes of the output signal of the receiver dependent upon the size of the rotary angle, in order to be able to evaluate or analyze any one indicator change as the locking control signal. The locking control signal occurs when roller 5 has again reached contact surface 4' of cam 4.

While various embodiments have been chosen to illustrate the invention, it will be understood by those skilled in the art that various changes and modifications can be made therein without departing from the scope of the invention as defined in the appended claims.

What is claimed is:

1. A method for controlling locking of a rotatable tool holder of a tool turret during rotation of the tool holder into different angular positions distributed uniformly around an entire periphery of the tool holder, comprising the steps of:

rotating a control and driving device and the tool holder in one direction to a new angular position in which the tool holder is to be locked;

locking the tool holder in the new angular position by subsequent rotation of the control and driving device in an opposite direction; and determining the angular position of the tool holder by a rotating transmitter including rotating the rotating transmitter correspondingly to rotary movement of the control and driving device, producing digital signals with the rotating transmitter, each digital signal being associated with one of the angular positions of the tool holder which may be selected and changing a level of each digital signal in angular positions of the control and driving device during movement in directions into and out of associated positions of the control and driving device when locking condition of the tool holder is changed, and using changes in the level of signals for indicating locking of the tool holder.

2. A method according to claim 1 wherein the digital signals of the rotating transmitter associated with all of the angular positions are used as timing signals for incremental angular position determination.

3. An apparatus for controlling and synchronizing locking of a rotatable tool holder of a tool turret during rotation of the tool holder into different angular positions distributed uniformly around an entire periphery of the tool holder, comprising:

first and second driven parts coupled nonrotatably relative to the tool holder;

a driving part having coupling means for coupling said driving part to a drive motor so as to be rotated thereby, said driving part being coupled by form-locking means to said second driven part with backlash travel in rotary directions for rotary movement relative to said first and second driven parts between a first position in which the tool holder is locked and a second position in which the tool holder is unlocked;

a cam surface with two different levels and follower elements engaging said cam surface located between said driven and driving parts for axial movement of said driving part relative to one of said first and second driven parts; and a rotating transmitter coupled to said driving part for simultaneous rotation therewith, said rotating transmitter including a signal transmitter producing one digital control signal for each angular position of the tool holder which can be selected, each said signal having a middle aligned with a middle of one level portion of said cam surface and having flanks aligned with level changes in said cam surface for locking and unlocking of the tool holder.

4. An apparatus according to claim 3 wherein said rotating transmitter comprises a disk with windows, said windows having borders lying in series one after another in a direction of a disk rotation and causing changes in conditions of a light enclosure.

5. An apparatus according to claim 4 wherein said cam surface comprises edges between the two levels thereof, said edges corresponding to transitions between locking and unlocking of the tool holder; and the changes in conditions caused by said borders of said windows correspond to angular position of said edges.

6. An apparatus according to claim 5 wherein each of said windows has an equal width determined by a spacing between said borders thereof, regardless of the number of the angular positions of the tool holder which can be selected.

7. An apparatus according to claim 6 wherein said cam surface is provided at a cam disk which is usable for a nominal number of the angular positions of the tool holder which can be selected, two times the nominal number and four times the nominal number.

8. An apparatus according to claim 7 wherein said windows produce timing signals.

9. An apparatus according to claim 6 wherein said windows produce timing signals.

10. An apparatus according to claim 5 wherein said windows produce timing signals.

11. An apparatus according to claim 4 wherein said windows produce timing signals.

12. A method for rotating a tool holder which is rotatable into different selectable angular positions distributed uniformly around an entire revolution of the tool holder and which is to be locked in one of the selectable angular positions, and for controlling the locking condition of the tool holder, comprising the steps of:

unlocking the tool holder by rotating a control and driving device;

rotating the tool holder to a new one of the selectable angular positions by a continuation of the rotation of the control and driving device;

determining the angular position of the tool holder;

locking the tool holder in the new selectable angular position by subsequent rotation of the control and driving device in an opposite direction; and controlling the locking of the tool holder by rotating a rotating transmitter corresponding to the rotation of the control and driving device, producing digital signals by means of the rotating transmitter, each of the digital signals comprising one of two different levels and being associated with one of the selectable angular positions of the tool holder, and changing the digital signal level in the angular positions of the control and driving device during movement of the control and driving device when the locking condition of the tool holder is changed, and using the digital signals for indicating the locking condition of the tool holder.

13. A method according to claim 12 wherein the digital signals of the rotating transmitter associated with all of the angular positions are used as timing signals for incremental angular position determination.

* * * * *